Dec. 9, 1952

G. BRAIBANTI ET AL 2,620,752

KNEADING AND PRESSING DEVICE FOR MACHINES
FOR MAKING ALIMENTARY PASTES

Filed Aug. 1, 1947

INVENTORS
Giuseppe Braibanti and Mario Braibanti
BY

Patented Dec. 9, 1952

2,620,752

UNITED STATES PATENT OFFICE 2,620,752

KNEADING AND PRESSING DEVICE FOR MACHINES FOR MAKING ALIMENTARY PASTES

Giuseppe Braibanti and Mario Braibanti, Milan, Italy

Application August 1, 1947, Serial No. 765,592
In Italy December 18, 1940

Section 1, Public Law 690, August 8, 1946
Patent expires December 18, 1960

11 Claims. (Cl. 107—14)

1

This invention relates to automatic machines for the production of alimentary pastes, and more particularly to a device for kneading and pressing the dough used in the manufacture of such pastes.

It is known that in the automatic machines of this class wherein worms are employed, the kneading of the mass has been hitherto obtained by subjecting the mass to successive drawing operations; this system has the drawback that it causes the mass to heat too much and fatigues it. On the other hand, pressure worms have the shortcoming that they cause an uneven pressure on the various points of the die so that the drawing speed is not uniform; this in turn leads to the production of short tubes of paste of uneven length and to waste when long tubes are made.

The general object of this invention is to provide a device whereby the aforementioned drawbacks may be eliminated; more particularly, it is the object of this invention to provide a kneading and pressing device whereby working of the dough is caused under pressure in the work mass and the latter is uniformly distributed on the die thereby making it possible to dispense with any kind of kneading or distributing plates or the like. Other related objects will become apparent while the description proceeds.

The device according to our invention is illustrated in the accompanying drawing, wherein.

Figure 1:
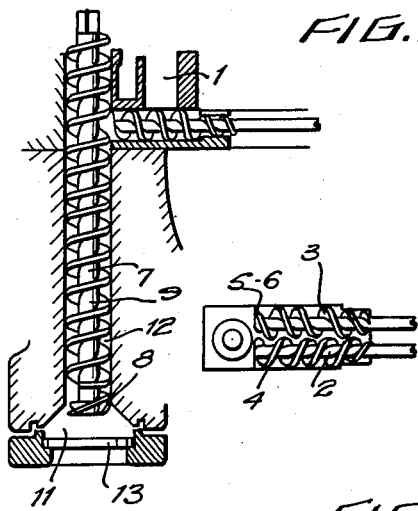
Fig. 1 is a vertical cross-section of the whole device.
Figure 2:
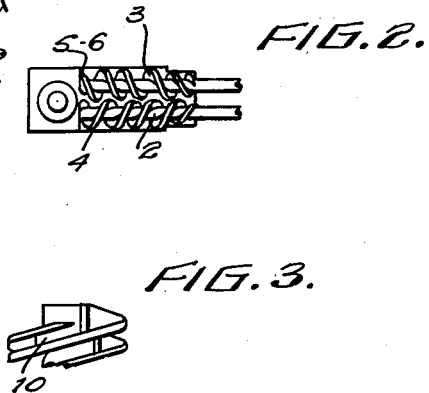
Fig. 2 is a plan view of the feeding worms.

Referring now to the drawing, 1 indicates the lower-most part of a hopper wherefrom the doughy mass is fed to the machine; the end portion of a paddle or blade mixer being suitable for this purpose. 2 and 3 are two horizontal worms rotating in opposite directions and meshing with each other inasmuch as each thread 4

Figure 3:
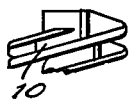
Fig. 3 is an enlarged view of part of the pressure worm showing the eccentrics or expansions provided on the shaft of said worm.

2 of worm 2 will be located between two adjacent threads 5 and 6 of worm 3. Vertical worm 7 is placed within a cylindrical chamber or case 12. The upper part of said worm 7 is provided with a single thread while its lower part has a plurality of threads, three as shown at 8. It will be understood that a plurality of vertical worms may be used instead of one. Shaft 9 of worm 7 has its end portion eccentrically shaped as shown at 10. However, the whole shaft may be made eccentric, and the eccentricity may vary for each portion of the shaft comprised between any two adjacent threads as shown in Fig. 3; or any such portion of the worm shaft may be provided with expansions or projections, or the like, of different size and shape and in different angular relationship with each other.

Cylindrical chamber 12 wherein worm 7 is enclosed, has its lowermost part enlarged to form a frusto-conical chamber 11. Die 13 forms the bottom of said chamber 11.

In operation, dough is continuously fed through hopper 1 to horizontal worms 2 and 3. The threads of worms 2 and 3 engage the doughy mass, and as the worms rotate in opposite directions the dough is fed forward and into chamber 12 to be engaged by vertical worm 7; concurrently the doughy mass is subjected to working under pressure and a kneading of the mass is brought about.

Vertical worm 7 then engages the mass fed thereto and presses it against die 13; concurrently, the mass is subjected to further working under pressure because of the action of the eccentric portions of shaft 9, or of the expansions or the like that may be provided on said shaft instead of the eccentrics. The kneading of the mass is thereby completed.

As the lower portion 8 of worm 7 is provided with a plurality of threads, the mass is discharged from several points at a time, and therefore a perfect distribution of the mass on the die is achieved resulting in a uniform drawing speed.

It will be understood that the device and the various parts thereof have been illustrated merely by way of example and that many changes may be made in the description and drawing without departing from the spirit of the invention or exceeding the scope of the claims.

Figure 4:
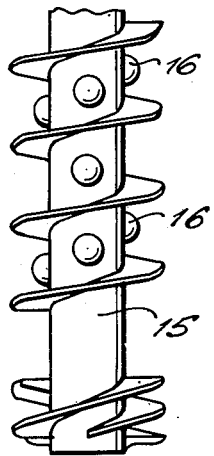
Fig. 4 is a fragmentary, partly sectional view of a feeding worm different from that illustrated in Fig. 1.

Instead of using a worm 7, as illustrated in Fig. 1, a worm 15 as illustrated in Fig. 4 may be used. This worm 15 is provided with a plurality of projections 16 located between adjacent threads, being distributed about the axis of worm 15, and being of a length shorter than the depth of the threads. Also, the worm 15 is provided with a plurality of threads at its lower end portion, as is clearly shown in Fig. 4.

Figure 5:
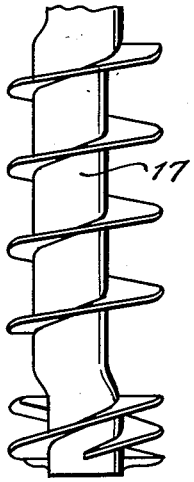
Fig. 5 is a fragmentary, partly sectional view of another embodiment of a feeding worm.

In the embodiment of the invention which is illustrated in Fig. 5, the worm shaft 17 is eccentric over a portion thereof so as to provide the desired working of the dough against the side of the cylinders, this worm shaft 17 also having a plurality of threads at its lower end.

Figure 6:
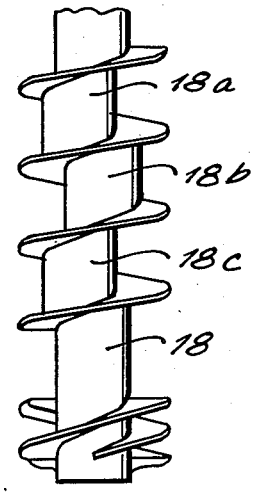
Fig. 6 is a fragmentary, partly sectional view of still another feeding worm construction.

The embodiment of the invention which is illustrated in Fig. 6 differs from those illustrated in Figs. 1, 4 and 5 in that the worm shaft 18 is provided with eccentric portions 18a, 18b and 18c which are respectively located between a pair of adjacent threads, these eccentric portions cooperating with the cylinder wall to produce the desired working of the dough. The worm shaft 18 also includes a plurality of threads at its lower end.

What we claim is:

1. In a machine for preparing alimentary pastes, in combination, at least one first cylinder having an outlet at one of its ends; an inlet to said first cylinder, said inlet being spaced from said outlet; a pair of feeding screws disposed lengthwise and adjacently to each other in said first cylinder, the said screws rotating in opposite directions and having outer thread diameters increasing toward the said outlet of the said first cylinder, and each of the said screws having only a thread of constant pitch and a shaft of constant thickness, at least one second cylinder extending in a direction which is substantially perpendicular to the direction in which said first cylinder extends, the said second cylinder having an outlet at one of its ends; an opening in the lateral wall of said second cylinder intermediately of its ends, the said opening being in communication with the outlet of said first cylinder; a single pressure screw provided in said second cylinder, mounted only for rotation and feeding toward the outlet of said second cylinder; and a pressure chamber in communication with the outlet of said second cylinder.

2. In a machine for preparing alimentary pastes, in combination, at least one first generally horizontally extending cylinder having an outlet at one of its ends; an inlet to said first cylinder, said inlet being spaced from said outlet; a pair of feeding screws disposed lengthwise and adjacently to each other in said first cylinder, the said screws rotating in opposite directions and having outer thread diameters increasing toward the said outlet of said first cylinder, and each of the said screws having only a thread of constant pitch and a shaft of constant thickness; at least one second cylinder extending in a vertical direction, the said second cylinder having an outlet at one of its ends; an opening in the lateral wall of said second cylinder intermediately of its ends, the said opening being in communication with the outlet of said first cylinder; a single pressure screw provided in said second cylinder, mounted only for rotation and feeding toward the outlet of said second cylinder; a pressure chamber disposed at the outlet end of said second cylinder; and a generally horizontally extending die plate disposed in said pressure chamber.

3. In a machine for preparing alimentary pastes, in combination, at least one first cylinder having an outlet at one of its ends; an inlet to said first cylinder, said inlet being spaced from said outlet; a pair of feeding screws disposed lengthwise and adjacently to each other in said first cylinder, the said screws rotating in opposite directions and having outer thread diameters increasing toward the said outlet of the said first cylinder; at least one second cylinder extending in a direction which is substantially perpendicular to the direction in which said first cylinder extends, the said second cylinder having an outlet at one of its ends; an opening in the lateral wall of said second cylinder intermediately of its ends, the said opening being in communication with the outlet of said first cylinder; a single pressure screw provided in said second cylinder and feeding toward the outlet of said second cylinder, the said pressure screw having a shaft and having a thread terminating short of the feeding end of said shaft; a plurality of additional threads provided on said shaft at the feed end of said pressure screw; and a pressure chamber in communication with the outlet of said second cylinder.

4. In a machine for preparing alimentary pastes, in combination, at least one first cylinder having an outlet at one of its ends; an inlet to said first cylinder, said inlet being spaced from said outlet; a pair of feeding screws disposed lengthwise and adjacently to each other in said first cylinder, the said screws rotating in opposite directions and having outer thread diameters increasing toward the said outlet of the said first cylinder; at least one second cylinder extending in a direction which is substantially perpendicular to the direction in which said first cylinder extends, the said second cylinder having an outlet at one of its ends; an opening in the lateral wall of said second cylinder intermediately of its ends, the said opening being in communication with the outlet of said first cylinder; a single pressure screw provided in said second cylinder and feeding toward the outlet of said second cylinder, the said pressure screw having a number of threads at its feed end in excess of the number of threads provided at the remaining portion of said screw; and a pressure chamber disposed at the outlet of said second cylinder.

5. In a machine for preparing alimentary pastes, in combination, at least one first cylinder having an outlet at one of its ends; an inlet to said first cylinder, said inlet being spaced from said outlet; a pair of feeding screws disposed lengthwise and adjacently to each other in said first cylinder, the said screws rotating in opposite directions and having outer thread diameters increasing toward the said outlet of the said first cylinder; at least one second cylinder extending in a direction which is substantially perpendicular to the direction in which said first cylinder extends, the said second cylinder having an outlet at one of its ends; an opening in the lateral wall of said second cylinder intermediately of its ends, the said opening being in communication with the outlet of said first cylinder; a single pressure screw provided in said second cylinder and feeding toward the outlet of said second cylinder, the said pressure screw having a shank and at least one thread, at least one portion of said shank being disposed eccentrically with respect to the axis of the pressure screw; and a pressure chamber disposed at the outlet of said second cylinder.

6. In a machine for preparing alimentary pastes, in combination, at least one first cylinder having an outlet at one of its ends; an inlet to said first cylinder, said inlet being spaced from said outlet; a pair of feeding screws disposed lengthwise and adjacently to each other in said first cylinder, the said screws rotating in opposite directions and having outer thread diameters increasing toward the said outlet of the said first cylinder; at least one second cylinder extending in a direction which is substantially perpendicular to the direction in which said first cylinder extends, the said second cylinder having an outlet at one of its ends; an opening in the lateral wall of said second cylinder intermediately of its ends, the said opening being in communication with the outlet of said first cylinder; a single pressure screw provided in said second cylinder and feeding toward the outlet of said second cylinder, the said pressure screw having a shank and at least one thread; a plurality of portions of said shank being disposed eccentrically with respect to the axis of said pressure screw and extending in relatively different radial directions; and a pressure chamber disposed at the outlet of said second cylinder.

7. In a machine for preparing alimentary pastes, in combination, at least one first cylinder having an outlet at one of its ends; an inlet to said first cylinder, said inlet being spaced from said outlet; a pair of feeding screws disposed lengthwise and adjacently to each other in said first cylinder, the said screws rotating in opposite directions and having outer thread diameters increasing toward the said outlet of the said first cylinder; at least one second cylinder extending in a direction which is substantially perpendicular to the direction in which said first cylinder extends, the said second cylinder having an outlet at one of its ends; an opening in the lateral wall of said second cylinder intermediately of its ends, the said opening being in communication with the outlet of said first cylinder; a single pressure screw provided in said second cylinder and feeding toward the outlet of said second cylinder, the said pressure screw having a shank and at least one thread; a plurality of portions of said shank being disposed eccentrically with respect to the axis of said pressure screw and having different degrees of eccentricity; and a pressure chamber disposed at the outlet of said second cylinder.

8. In a machine for preparing alimentary pastes, in combination, at least one first cylinder having an outlet at one of its ends; an inlet to said first cylinder, said inlet being spaced from said outlet; a pair of feeding screws disposed lengthwise and adjacently to each other in said first cylinder, the said screws rotating in opposite directions and having outer thread diameters increasing toward the said outlet of the said first cylinder; at least one second cylinder extending in a direction which is substantially perpendicular to the direction in which said first cylinder extends, the said second cylinder having an outlet at one of its ends; an opening in the lateral wall of said second cylinder intermediately of its ends, the said opening being in communication with the outlet of said first cylinder; a single pressure screw provided in said second cylinder and feeding toward the outlet of said second cylinder, the said pressure screw having a shank and at least one thread; a plurality of portions of said shank being disposed eccentrically with respect to the axis of said pressure screw and extending in relatively different radial directions and having different degrees of eccentricity; and a pressure chamber disposed at the outlet of said second cylinder.

9. In a machine for preparing alimentary pastes, in combination, at least one first cylinder having an outlet at one of its ends; an inlet to said first cylinder, said inlet being spaced from said outlet; a pair of feeding screws disposed lengthwise and adjacently to each other in said first cylinder, the said screws rotating in opposite directions and having outer thread diameters increasing toward the said outlet of the said first cylinder; at least one second cylinder extending in a direction which is substantially perpendicular to the direction in which said first cylinder extends, the said second cylinder having an outlet at one of its ends; an opening in the lateral wall of said second cylinder intermediately of its ends, the said opening being in communication with the outlet of said first cylinder; a single pressure screw provided in said second cylinder and feeding toward the outlet of said second cylinder, the said pressure screw having a shaft and having a thread; projections provided on said shaft intermediately of adjacent thread convolutions and of a length shorter than the depth of said thread; and a pressure chamber disposed at the outlet of said second cylinder.

10. In a machine for preparing alimentary pastes, in combination, at least one first cylinder having an outlet at one of its ends; an inlet to said first cylinder, said inlet being spaced from said outlet; a pair of feeding screws disposed lengthwise and adjacently to each other in said first cylinder, the said screws rotating in opposite directions and having outer thread diameters increasing toward the said outlet of the said first cylinder; at least one second cylinder extending in a direction which is substantially perpendicular to the direction in which said first cylinder extends, the said second cylinder having an outlet at one of its ends; an opening in the lateral wall of said second cylinder intermediately of its ends, the said opening being in communication with the outlet of said first cylinder; a single pressure screw provided in said second cylinder and feeding toward the outlet of said second cylinder, the said pressure screw having a shaft and having a thread; projections provided on said shaft intermediately of adjacent thread convolutions and of a length shorter than the depths of said thread, said projections being distributed about the axis of said shaft; and a pressure chamber disposed at the outlet of said second cylinder.

11. In a machine for preparing alimentary pastes, in combination, a plurality of generally horizontally extending first cylinders, each of said cylinders having an outlet at one of its ends; inlets, one for each of said first cylinders; a pair of feeding screws disposed lengthwise and adjacently to each other in each of said first cylinders, the said screws rotating in opposite directions and having outer thread diameters increasing toward said outlet of said first cylinder; a plurality of second cylinders extending in generally vertical direction, one for each of said first cylinders, each of said second cylinders having an outlet at one of its ends; an opening provided in the lateral wall of each of said second cylinders intermediately of its ends, the said opening being in communication with the outlet of the corresponding first cylinder; a single pressure screw provided in each of said second cylinders, the said pressure screw feeding toward the outlet of said second cylinder and having a number of threads at its feed end in excess of the number of threads provided at the remaining portion of the pressure screw; and a generally frusto-conical wall portion extending from the outlet of each of said second cylinders and coaxially therewith; and a common pressure chamber disposed at the outer end of said conical wall portions.

GIUSEPPE BRAIBANTI.
MARIO BRAIBANTI.

REFERENCES CITED

The following references are of record in the file of this patent:

UNITED STATES PATENTS

| Number | Name | Date |
|---|---|---|
| 155,602 | Wiegand | Oct. 6, 1874 |
| 523,116 | Gelinck | July 17, 1894 |
| 637,734 | Hall | Nov. 21, 1899 |
| 1,925,010 | Sizer | Aug. 29, 1933 |
| 2,026,667 | Braibanti et al. | Jan. 7, 1936 |
| 2,119,162 | Hartner | May 31, 1938 |

FOREIGN PATENTS

| Number | Country | Date |
|---|---|---|
| 14,659 | Sweden | Sept. 6, 1902 |
| 355,570 | Germany | June 29, 1922 |
| 511,782 | France | Jan. 4, 1921 |